United States Patent
Matsunobu et al.

(10) Patent No.: US 11,100,706 B2
(45) Date of Patent: Aug. 24, 2021

(54) THREE-DIMENSIONAL RECONSTRUCTION METHOD, THREE-DIMENSIONAL RECONSTRUCTION APPARATUS, AND GENERATION METHOD FOR GENERATING THREE-DIMENSIONAL MODEL

(71) Applicant: Panasonic Intellectual Property Corporation of America, Torrance, CA (US)

(72) Inventors: Toru Matsunobu, Osaka (JP); Toshiyasu Sugio, Osaka (JP); Satoshi Yoshikawa, Hyogo (JP); Tatsuya Koyama, Kyoto (JP); Yoichi Sugino, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 9 days.

(21) Appl. No.: 16/510,125

(22) Filed: Jul. 12, 2019

(65) Prior Publication Data

US 2019/0333269 A1    Oct. 31, 2019

Related U.S. Application Data

(63) Continuation of application No. PCT/JP2018/001126, filed on Jan. 17, 2018.

(60) Provisional application No. 62/447,974, filed on Jan. 19, 2017.

(51) Int. Cl.
*G06T 17/05*    (2011.01)
*G06T 7/55*    (2017.01)

(52) U.S. Cl.
CPC ............ *G06T 17/05* (2013.01); *G06T 7/55* (2017.01); *G06T 2200/08* (2013.01)

(58) Field of Classification Search
CPC ....... G06T 17/05; G06T 7/55; G06T 2200/08; G06T 7/344; G06T 15/205; G06T 2207/30228

See application file for complete search history.

(56) References Cited

U.S. PATENT DOCUMENTS

2015/0381968 A1* 12/2015 Arora ................ G06T 17/00
348/47
2018/0017379 A1    1/2018 Nakagawa et al.

FOREIGN PATENT DOCUMENTS

| JP | 2010-250452 | 11/2010 |
| WO | 2016/158855 | 10/2016 |

OTHER PUBLICATIONS

International Search Report (ISR) dated Apr. 17, 2018 in International (PCT) Application No. PCT/JP2018/001126.

* cited by examiner

*Primary Examiner* — Jennifer Mehmood
*Assistant Examiner* — Andrew Shin
(74) *Attorney, Agent, or Firm* — Wenderoth, Lind & Ponack, L.L.P.

(57) ABSTRACT

A three-dimensional reconstruction method includes: reconstructing a first three-dimensional model from a first multi-viewpoint image obtained by shooting a real space, and reconstructing a second three-dimensional model from a second multi-viewpoint image obtained by shooting the real space at a different time; and matching world coordinate systems of the first three-dimensional model and the second three-dimensional model.

12 Claims, 11 Drawing Sheets

FIG. 14
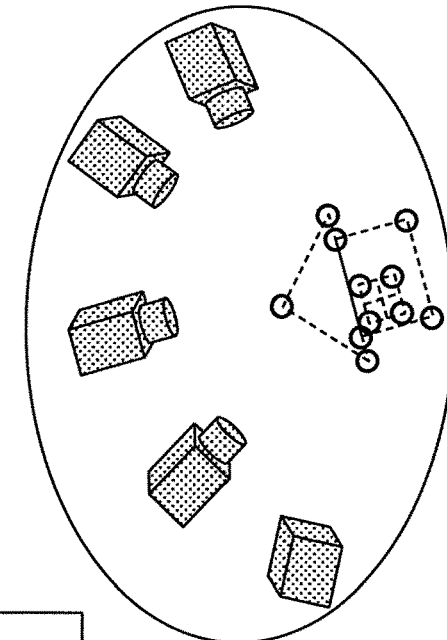
TARGET MODEL
CORRECT ROTATION MATRIX, TRANSLATION VECTOR, AND SCALE SUCH THAT ERROR OF POSITION INFORMATION OF ALL CAMERAS AND THREE-DIMENSIONAL POINTS IS MINIMIZED
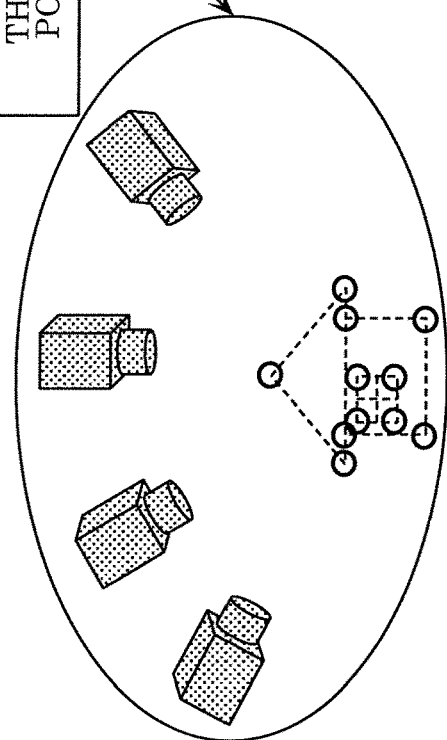
REFERENCE MODEL

THREE-DIMENSIONAL RECONSTRUCTION METHOD, THREE-DIMENSIONAL RECONSTRUCTION APPARATUS, AND GENERATION METHOD FOR GENERATING THREE-DIMENSIONAL MODEL

CROSS REFERENCE TO RELATED APPLICATIONS

This application is a U.S. continuation application of PCT International Patent Application Number PCT/JP2018/001126 filed on Jan. 17, 2018, claiming the benefit of priority of U.S. Provisional Patent Application No. 62/447,974 filed on Jan. 19, 2017, the entire contents of which are hereby incorporated by reference.

BACKGROUND

1. Technical Field

The present disclosure relates to a three-dimensional reconstruction method, a three-dimensional reconstruction apparatus, and a generation method for generating a three-dimensional model.

2. Description of the Related Art

In the three-dimensional reconstruction technology in the field of computer vision, a plurality of two-dimensional images are associated with one another so that the positions and orientations of cameras, and the three-dimensional position of a subject are estimated. Further, camera calibration and three-dimensional points reconstruction are performed. For example, such three-dimensional reconstruction technology is used in a next-generation wide area monitoring system, or a free-viewpoint video generation system.

The apparatus described in Japanese Unexamined Patent Application Publication No. 2010-250452 performs calibration among three or more cameras, and converts each camera coordinate system into a virtual camera coordinate system of arbitrary viewpoint based on acquired camera parameters. The apparatus performs association between images after coordinate conversion by block matching in the virtual camera coordinate system, to estimate distance information. The apparatus synthesizes an image of virtual camera viewpoint based on the estimated distance information.

SUMMARY

A three-dimensional reconstruction method according to an aspect of the present disclosure includes: reconstructing a first three-dimensional model from a first multi-viewpoint image obtained by shooting a real space, and reconstructing a second three-dimensional model from a second multi-viewpoint image obtained by shooting the real space at a different time; and matching world coordinate systems of the first three-dimensional model and the second three-dimensional model.

Note that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 14 is a diagram to illustrate coordinate matching scheme 2 according to an embodiment.

DETAILED DESCRIPTION OF THE EMBODIMENT

Figure 1:
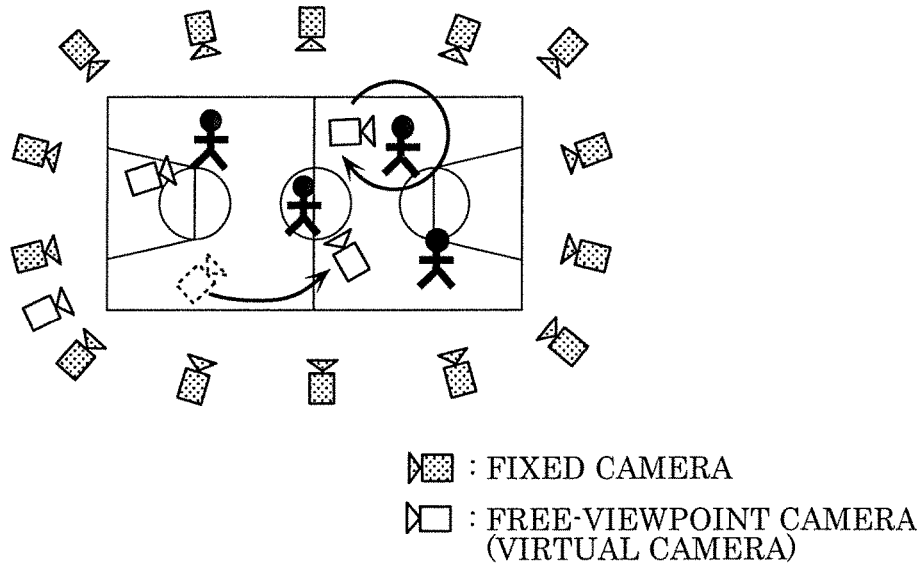
FIG. 1 is a diagram to show an outline of a free-viewpoint video generation system according to an embodiment.

When a three-dimensional model is reconstructed in time series by using multi-viewpoint images synchronously shot in time series, if calibration and estimation of distance information are performed independently at each time by the method according to Japanese Unexamined Patent Application Publication No. 2010-250452, the coordinate axes of three-dimensional model are different at each time so that changes of three-dimensional information in a time direction cannot be utilized. Specifically, when the position or orientation of camera is different or a subject moves between times, the coordinate axes of three-dimensional model may also differ at each time. As a result of this, for example, even when a virtual camera viewpoint is fixed, a free-viewpoint video in which the entire scene is continuously blurred may be generated.

Accordingly, a three-dimensional reconstruction method or a three-dimensional reconstruction apparatus, which can improve the accuracy of positional relationship of three-dimensional model at each time, will be described.

A three-dimensional reconstruction method according to an aspect of the present disclosure includes: reconstructing a first three-dimensional model from a first multi-viewpoint image obtained by shooting a real space, and reconstructing a second three-dimensional model from a second multi-viewpoint image obtained by shooting the real space at a different time; and matching world coordinate systems of the first three-dimensional model and the second three-dimensional model.

Accordingly, since the three-dimensional reconstruction method can improve the accuracy of positional relationship of three-dimensional model at each time, it is possible to improve the accuracy of three-dimensional model.

For example, in the matching, a coordinate matching scheme may be selected based on at least one of reliability of the first three-dimensional model or reliability of the second three-dimensional model, and the world coordinate systems of the first three-dimensional model and the second three-dimensional model may be matched by using the coordinate matching scheme selected.

Accordingly, the three-dimensional reconstruction method can use an appropriate coordinate matching scheme in accordance with reliability.

For example, the reliability of the three-dimensional model may utilize, as an index, an error between a reprojection point which is obtained by reprojecting a three-dimensional point in the three-dimensional model onto an imaging plane of the multi-viewpoint image using camera parameters of a camera which is used for shooting the multi-viewpoint image, and a two-dimensional point on the multi-viewpoint image, the two-dimensional point corresponding to the three-dimensional point.

For example, in the matching, a first coordinate matching scheme may be selected when the reliability is higher than a reference value, the first coordinate matching scheme being a method in which world coordinate systems of the first three-dimensional model and the second three-dimensional model are matched based on an error between a part of the first three-dimensional model and a part of the second three-dimensional model, and a second coordinate matching scheme may be selected when the reliability is lower than the reference value, the second coordinate matching scheme being a method in which world coordinate systems of the first three-dimensional model and the second three-dimensional model are matched based on an error between a whole of the first three-dimensional model and a whole of the second three-dimensional model.

Accordingly, the three-dimensional reconstruction method can use an appropriate coordinate matching scheme in accordance with reliability.

For example, the first three-dimensional model may include a plurality of three-dimensional points indicating a subject of the first multi-viewpoint image, and positions and orientations of a plurality of cameras that shot the first multi-viewpoint image, the second three-dimensional model may include a plurality of three-dimensional points indicating a subject of the second multi-viewpoint image, and three-dimensional positions and orientations of a plurality of cameras that shot the second multi-viewpoint image, and in the matching, world coordinates of three-dimensional points of a plurality of subjects and three-dimensional positions and orientations of a plurality of cameras may be matched.

For example, in the matching, when the first coordinate matching scheme is selected: two points may be selected out of the plurality of three-dimensional points and the three-dimensional positions of the plurality of cameras; and deviation of scale between the first three-dimensional model and the second three-dimensional model may be corrected based on a distance between the two points selected in each of the first three-dimensional model and the second three-dimensional model.

For example, in the matching, when the first coordinate matching scheme is selected: one camera may be selected out of the plurality of cameras; and deviation in rotation or translation between the first three-dimensional model and the second three-dimensional model may be corrected based on the three-dimensional position and the orientation of the one camera selected in each of the first three-dimensional model and the second three-dimensional model.

For example, in the matching, when the second coordinate matching scheme is selected, at least one of rotation, translation, or scale of one of the first three-dimensional model and the second three-dimensional model may be corrected such that an error on positions of the plurality of three-dimensional points and three-dimensional positions of the plurality of cameras in the first three-dimensional model and the second three-dimensional model is reduced while maintaining relative relation between the plurality of three-dimensional points and the three-dimensional positions of the plurality of cameras in the first three-dimensional model, and relative relation between the plurality of three-dimensional points and the three-dimensional positions of the plurality of cameras in the second three-dimensional model.

For example, in the reconstructing, a plurality of three-dimensional models including the second three-dimensional model may be reconstructed from each of a plurality of multi-viewpoint images obtained by shooting the real space at different times, and in the matching: the second three-dimensional model may be selected as the reference model for the first three-dimensional model from the plurality of three-dimensional models based on reliability of the plurality of three-dimensional models, and world coordinates of the first three-dimensional model may be matched with world coordinates of the second three-dimensional model.

Accordingly, since the three-dimensional the three-dimensional reconstruction method can match the world coordinates of the first three-dimensional model with, for example, those of the second three-dimensional model which has a high reliability, the three-dimensional reconstruction method can improve the accuracy of coordinate matching.

For example, in the reconstructing, a plurality of three-dimensional models including the second three-dimensional model may be reconstructed from each of a plurality of multi-viewpoint images obtained by shooting the real space at different times, and in the matching, the second three-dimensional model may be selected as the reference model for the first three-dimensional model from the plurality of three-dimensional models based on a difference between a time of the first three-dimensional model and a time of each of the plurality of three-dimensional models, and world coordinates of the first three-dimensional model may be matched with world coordinates of the second three-dimensional model.

Accordingly, since the three-dimensional reconstruction method can match the world coordinates of the first three-dimensional model with, for example, those of a second three-dimensional model which is close to the first three-dimensional model in time, the three-dimensional reconstruction method can improve the accuracy of coordinate matching.

A three-dimensional reconstruction apparatus according to an aspect of the present disclosure includes: a reconstruction circuit that reconstructs a first three-dimensional model from a first multi-viewpoint image obtained by shooting a real space, and reconstructs a second three-dimensional model from a second multi-viewpoint image obtained by shooting the real space at a different time, and a coordinate matching circuit that matches world coordinate systems of the first three-dimensional model and the second three-dimensional model.

Accordingly, since the three-dimensional reconstruction method can improve the accuracy of positional relation of three-dimensional models at each time, the three-dimensional reconstruction method can improve the accuracy of the three-dimensional model.

Note that these generic or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

The following describes embodiments with reference to the drawings. Note that the following embodiments show exemplary embodiments of the present disclosure. The numerical values, shapes, materials, structural components, the arrangement and connection of the structural components, steps, the processing order of the steps, etc. shown in the following embodiments are mere examples, and thus are not intended to limit the present disclosure. Of the structural components described in the following embodiments, structural components not recited in any one of the independent claims that indicate the broadest concepts will be described as optional structural components.

Embodiment

The three-dimensional reconstruction apparatus according to an embodiment of the present disclosure can reconstruct a time-series three-dimensional model whose coordinate axes are consistent between times. Specifically, first, three-dimensional reconstruction apparatus 200 acquires a three-dimensional model at each time by performing three-dimensional reconstruction independently at each time. Next, the three-dimensional reconstruction apparatus performs coordinate matching of three-dimensional model between times, thereby generating a time-series three-dimensional model whose coordinate axes are consistent between times.

This allows the three-dimensional reconstruction apparatus to generate a time-series three-dimensional model in which relative positional relationship between the subject and the camera at each time is highly accurate regardless of fixed/non-fixed state of the camera or moving/stationary state of the subject, and which can utilize information that changes in a time direction.

FIG. 1 is a diagram to show an outline of a free-viewpoint video generation system. For example, a space to be shot can be three-dimensionally reconstructed (three-dimensional space reconstruction) by shooting the same space from multi-viewpoints by using a calibrated camera (for example, fixed camera). By performing tracking, scene analysis, and video rendering using these three-dimensionally reconstructed data, a video seen from arbitrary viewpoint (free-viewpoint camera) can be generated. This allows realization of a next-generation wide-area monitoring system, and a free-viewpoint video generation system.

Figure 2:
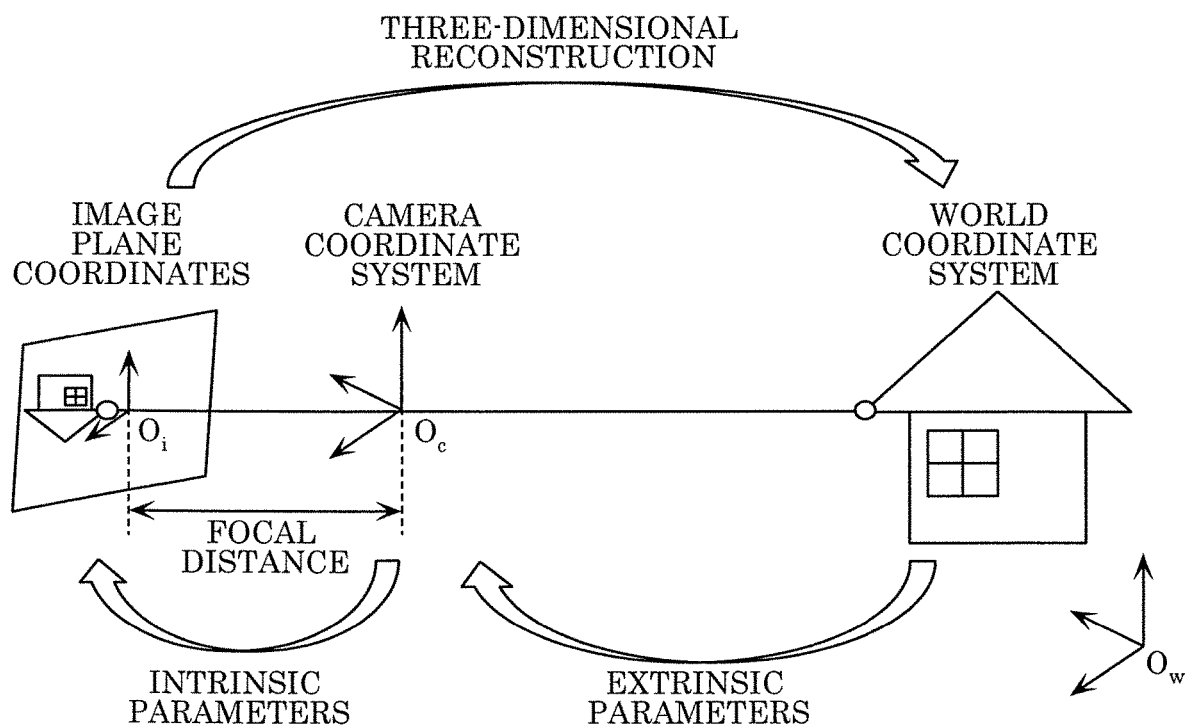
FIG. 2 is a diagram to illustrate a three-dimensional reconstruction processing according to an embodiment.

A three-dimensional reconstruction in the present disclosure will be defined. A video or an image which is obtained by shooting a subject present in a real space by a plurality of cameras at different viewpoints is called as a multi-viewpoint video or a multi-viewpoint image. That is, a multi-viewpoint image includes a plurality of two-dimensional images obtained by shooting a same subject from different viewpoints. Moreover, multi-viewpoint images shot in time-series are called as a multi-viewpoint video. Reconstructing a subject in a three-dimensional space by using the multi-viewpoint image is called as three-dimensional reconstruction. FIG. 2 is a diagram to show a mechanism of three-dimensional reconstruction.

The three-dimensional reconstruction apparatus reconstructs points in an image plane in a world coordinate system by using camera parameters. A subject reconstructed in a three-dimensional space is called as a three-dimensional model. A three-dimensional model of a subject indicates three-dimensional positions of each of a plurality of points on the subject depicted on two-dimensional images of multi-viewpoints. A three-dimensional position is represented, for example, by three-value information consisting of an X component, Y component, and Z component of a three-dimensional coordinate space defined by X, Y, and Z axes. Note that the three-dimensional model may include not only three-dimensional positions, but also information indicating the color of each point or a surface feature of each point and its surrounding.

In this situation, the three-dimensional reconstruction apparatus may acquire camera parameters of each camera in advance, or estimate them at the same time as creation of a three-dimensional model. The camera parameters include intrinsic parameters including a focal distance, an image center, and the like of camera, and extrinsic parameters indicating three-dimensional position and orientation of camera.

FIG. 2 shows an example of typical pin-hole camera model. This model does not take lens distortion of camera into consideration. When taking lens distortion into consideration, the three-dimensional reconstruction apparatus uses a corrected position obtained by normalizing the position of a point in the image plane coordinate by a distortion model.

Figure 3:
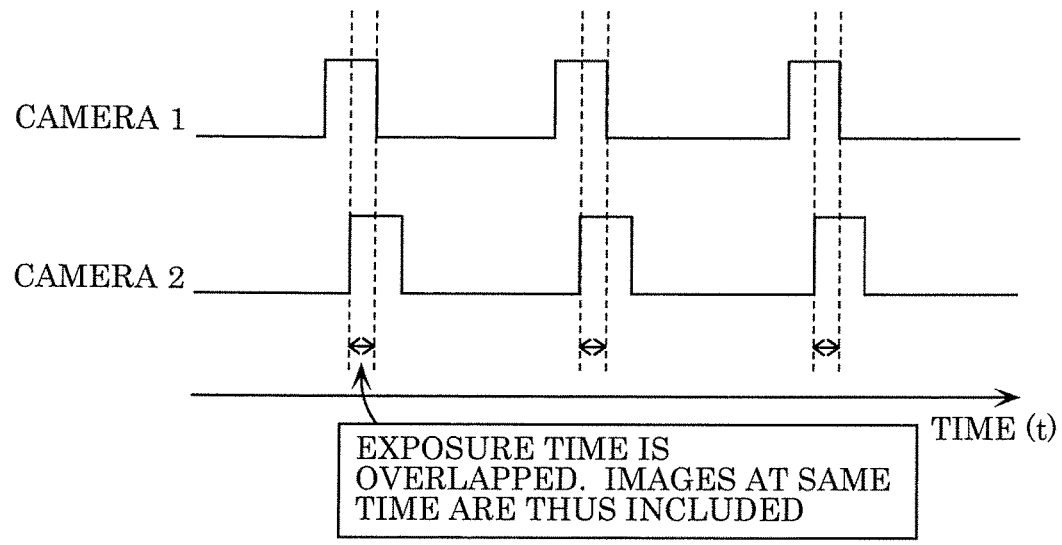
FIG. 3 is a diagram to illustrate synchronous shooting according to an embodiment.
Figure 4:
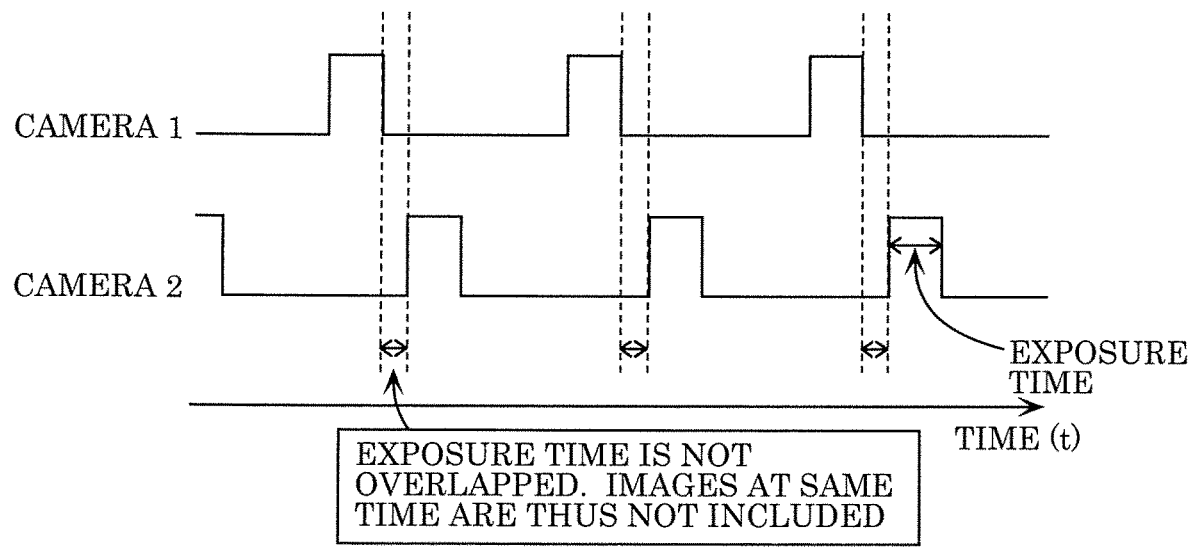
FIG. 4 is a diagram to illustrate synchronous shooting according to an embodiment.

Next, synchronous shooting of multi-viewpoint video will be described. FIGS. 3 and 4 are diagrams to illustrate synchronous shooting. Lateral directions of FIGS. 3 and 4 indicate time, and a time during which a rectangular signal appears indicates that the camera is being exposed to light. When acquiring an image by the camera, a time during which the shutter is opened is called as an exposure time.

During an exposure time, a scene which is exposed to an imaging element through a lens is obtained as an image. In FIG. 3, exposure times are overlapped in frames which are shot by two cameras with different viewpoints. For that reason, frames acquired by two cameras are discriminated to be synchronous frames which include a scene of the same time.

On the other hand, in FIG. 4, since there is no overlap of exposure time in two cameras, frames acquired by the two cameras are discriminated to be asynchronous frames which include no scene of the same time. Shooting synchronous frames by a plurality of cameras as shown in FIG. 3 is called as synchronous shooting.

Figure 5:
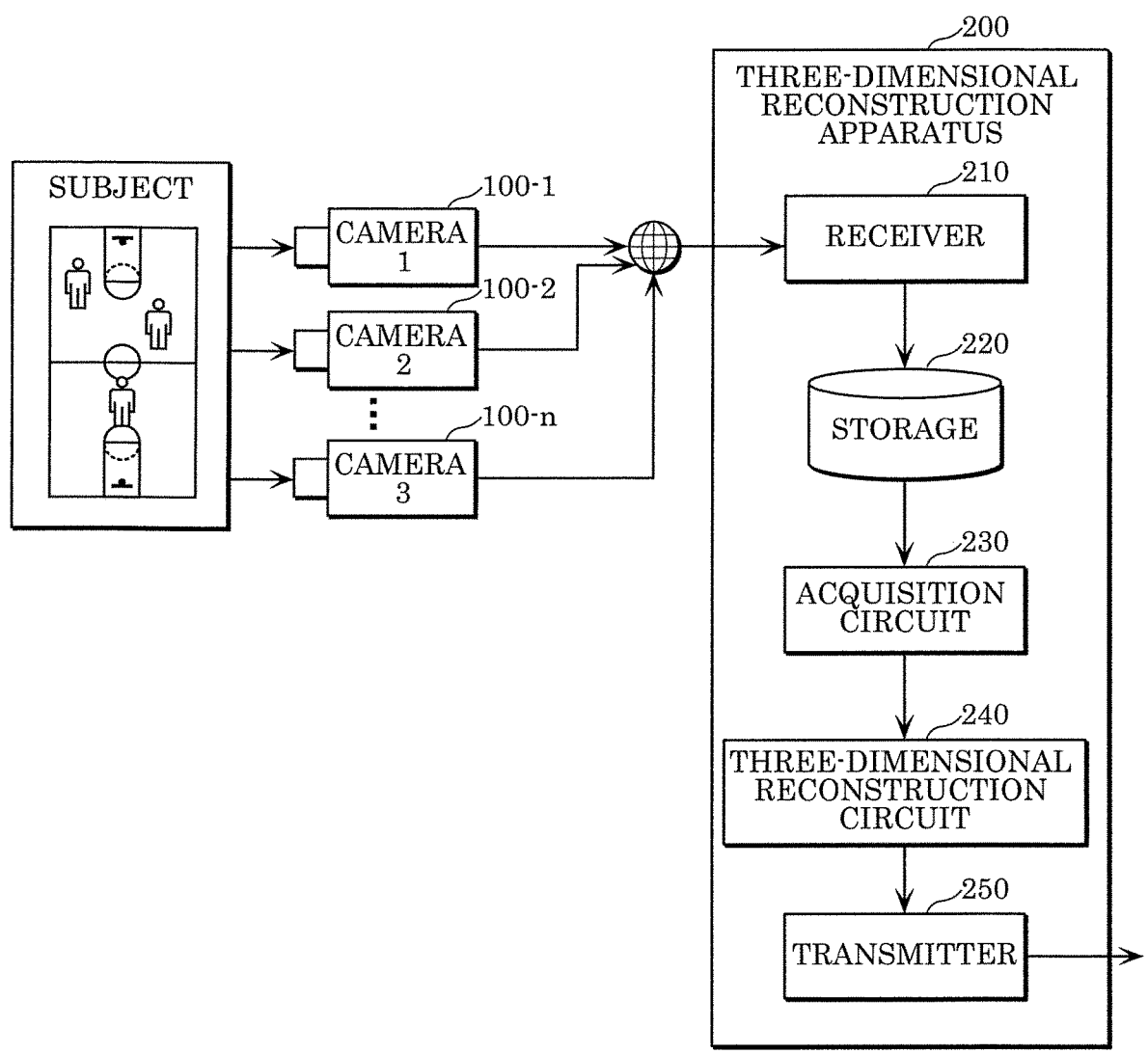
FIG. 5 is a block diagram of a three-dimensional reconstruction system according to an embodiment.

Next, the configuration of a three-dimensional reconstruction system according to an embodiment of the present disclosure will be described. FIG. 5 is a block diagram of a three-dimensional reconstruction system according to an embodiment of the present disclosure. The three-dimensional reconstruction system shown in FIG. 5 includes a plurality of cameras 100-1 to 100-$n$, and three-dimensional reconstruction apparatus 200.

The plurality of cameras 100-1 to 100-$n$ shoot a subject, and output a multi-viewpoint video which includes a plurality of shot videos. The transmission of the multi-viewpoint video may be performed via either of a public communication network such as the Internet, or a dedicated communication network. Alternatively, the multi-viewpoint video may be once stored in an external storage device such as a hard disk drive (HDD) or a solid state drive (SSD) etc. and is inputted into three-dimensional reconstruction apparatus 200 as needed. Alternatively, multi-viewpoint video is once transmitted to and stored in an external storage device such as a cloud server via a network. Then, the multi-viewpoint video may be transmitted to three-dimensional reconstruction apparatus 200 as needed.

Moreover, each of the plurality of cameras 100-1 to 100-*n* may be a fixed camera such as a monitor camera; a mobile camera such as a video camera, a smart phone, or a wearable camera; or a moving camera such as a drone with a shooting function.

Moreover, camera-specific information such as a camera ID to identify the camera used for shooting may be added to the multi-viewpoint video as header information of video or frame.

Synchronous shooting to shoot a subject at a same time may be performed in each frame by using the plurality of cameras 100-1 to 100-*n*. Alternatively, time of the clocks contained in the plurality of cameras 100-1 to 100-*n* are adjusted, and shooting time information may be added, or an index number to indicate shooting order may be added to each video or frame without performing synchronous shooting.

Information to indicate whether synchronous shooting is performed or asynchronous shooting is performed may be added as header information to each video set, each video, or each frame of multi-viewpoint video.

Moreover, three-dimensional reconstruction apparatus 200 includes receiver 210, storage 220, acquisition circuit 230, three-dimensional reconstruction circuit 240, and transmitter 250.

Figure 6:
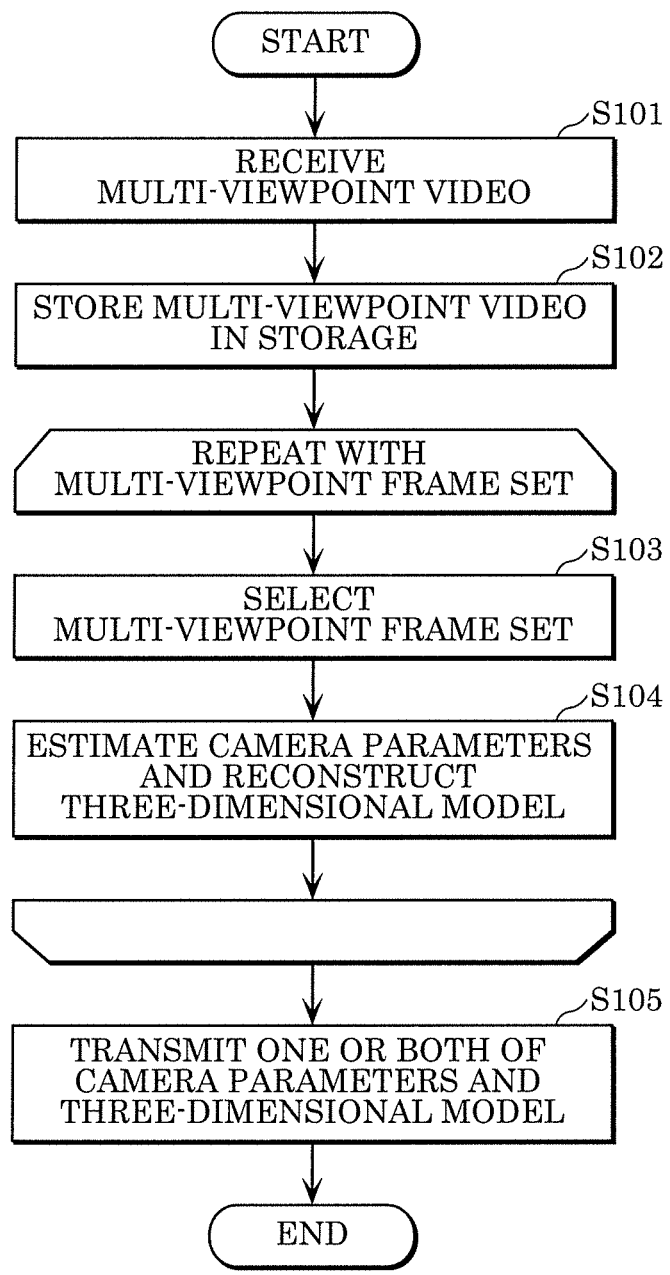
FIG. 6 is a flowchart to show processing by a three-dimensional reconstruction apparatus according to an embodiment.

Next, operation of three-dimensional reconstruction apparatus 200 will be described. FIG. 6 is a flowchart to show the operation of three-dimensional reconstruction apparatus 200 according to an embodiment of the present disclosure.

First, receiver 210 receives a multi-viewpoint video shot by a plurality of cameras 100-1 to 100-*n* (S101). Storage 220 stores the received multi-viewpoint video (S102).

Next, acquisition circuit 230 selects frames from multi-viewpoint video and outputs them to three-dimensional reconstruction circuit 240 as a multi-viewpoint frame set (S103).

For example, the multi-viewpoint frame set may be constituted by a plurality of frames: in which one frame is selected from each of videos of all viewpoints; in which at least one frame is selected from each of videos of all viewpoints; in which one frame is selected from each of videos of two or more viewpoints selected from multi-viewpoint video; or in which at least one frame is selected from each of videos of two or more viewpoints selected from multi-viewpoint video.

Moreover, when camera-specific information is not added to each frame of the multi-viewpoint frame set, acquisition circuit 230 may add camera-specific information separately to the header information of each frame, or all together to the header information of the multi-viewpoint frame set.

Further, when an index number indicating shooting time or shooting order is not added to each frame of multi-viewpoint frame set, acquisition circuit 230 may add the shooting time or index number separately to the header information of each frame, or all together to the header information of multi-viewpoint frame set.

Next, three-dimensional reconstruction circuit 240 estimates camera parameters of each camera by using the multi-viewpoint frame set, and reconstructs a three-dimensional model of a subject depicted in each frame (S104).

Moreover, the processing of steps S103 and S104 are repeatedly performed for each multi-viewpoint frame set.

Finally, transmitter 250 transmits one or both of the camera parameters and the three-dimensional model of a subject to the outside (S105).

Figure 7:
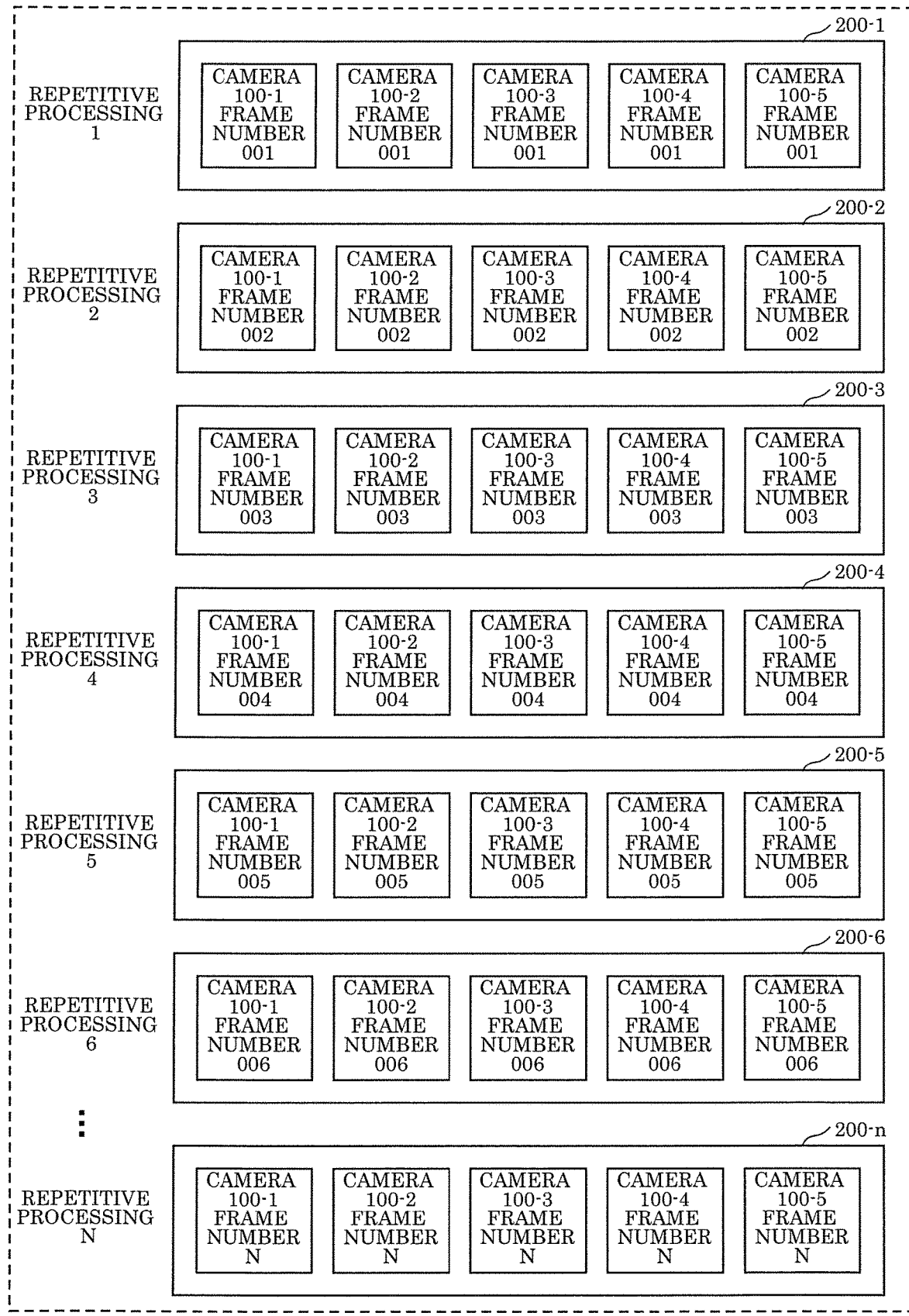
FIG. 7 is a diagram to show an example of a multi-viewpoint frame set according to an embodiment.

Next, the multi-viewpoint frame set will be described in detail. FIG. 7 is a diagram to show an example of multi-viewpoint frame set. Here, an example in which the multi-viewpoint frame set is determined by acquisition circuit 230 selecting one frame from each of 5 cameras 100-1 to 100-5 will be described.

Moreover, it is supposed that synchronous shooting is performed by a plurality of cameras. Camera IDs to identify the camera with which shooting is performed are given as 100-1 to 100-5 respectively to the header information of each frame. Moreover, frame numbers 001 to N indicating shooting order in each camera are given to the header information of each frame indicating that a subject at a same time is shot in frames having the same frame number between cameras.

Acquisition circuit 230 successively outputs multi-viewpoint frame sets 200-1 to 200-*n* to three-dimensional reconstruction circuit 240. Three-dimensional reconstruction circuit 240 successively performs three-dimensional reconstruction by repetitive processing using multi-viewpoint frame sets 200-1 to 200-*n*.

Multi-viewpoint frame set 200-1 is constituted by 5 frames of frame number 001 of camera 100-1, frame number 001 of camera 100-2, frame number 001 of camera 100-3, frame number 001 of camera 100-4, and frame number 001 of camera 100-5. Three-dimensional reconstruction circuit 240 reconstructs a three-dimensional model at a time when frame number 001 is shot by using multi-viewpoint frame set 200-1 as a first set of frames of multi-viewpoint video in repetitive processing 1.

Frame numbers are updated in all the cameras in multi-viewpoint frame set 200-2. Multi-viewpoint frame set 200-2 is constituted by 5 frames of frame number 002 of camera 100-1, frame number 002 of camera 100-2, frame number 002 of camera 100-3, frame number 002 of camera 100-4, and frame number 002 of camera 100-5. Three-dimensional reconstruction circuit 240 reconstructs a three-dimensional model at a time when frame number 002 is shot by using multi-viewpoint frame set 200-2 in repetitive processing 2.

Hereinafter, after repetitive processing 3 as well, frame numbers are updated in all the cameras. This allows three-dimensional reconstruction circuit 240 to reconstruct a three-dimensional model of each time.

However, since three-dimensional reconstruction is performed independently at each time, the coordinate axes and scales of the reconstructed plurality of three-dimensional models do not necessarily coincide with each other. That is, to acquire a three-dimensional model of a moving subject, it is necessary to match the coordinate axes and scales at each time.

In that case, each frame is given a shooting time and, based on the shooting time, acquisition circuit 230 creates a multi-viewpoint frame set by combining synchronous frames with asynchronous frames. Hereinafter, a discrimination method of a synchronous frame and an asynchronous frame by using the shooting time between two cameras will be described.

Let a shooting time of a frame selected from camera 100-1 be T1, a shooting time of a frame selected from camera 100-2 be T2, an exposure time of camera 100-1 be TE1, and an exposure time of camera 100-2 be TE2. Shooting times T1, T2 each refer to a time at which exposure is started in examples of FIGS. 3 and 4, that is, a time at which a rectangular signal rises up.

In this case, the exposure end time of camera 100-1 is T1+TE1. Here, if (Equation 1) or (Equation 2) holds, two cameras are considered to be shooting a subject of a same time, and it is discriminated that two frames are synchronous frames.

$$T1 \leq T2 \leq T1+TE1 \quad \text{(Equation 1)}$$

$$T1 \leq T2+TE2 \leq T1+TE1 \quad \text{(Equation 2)}$$

Figure 8:
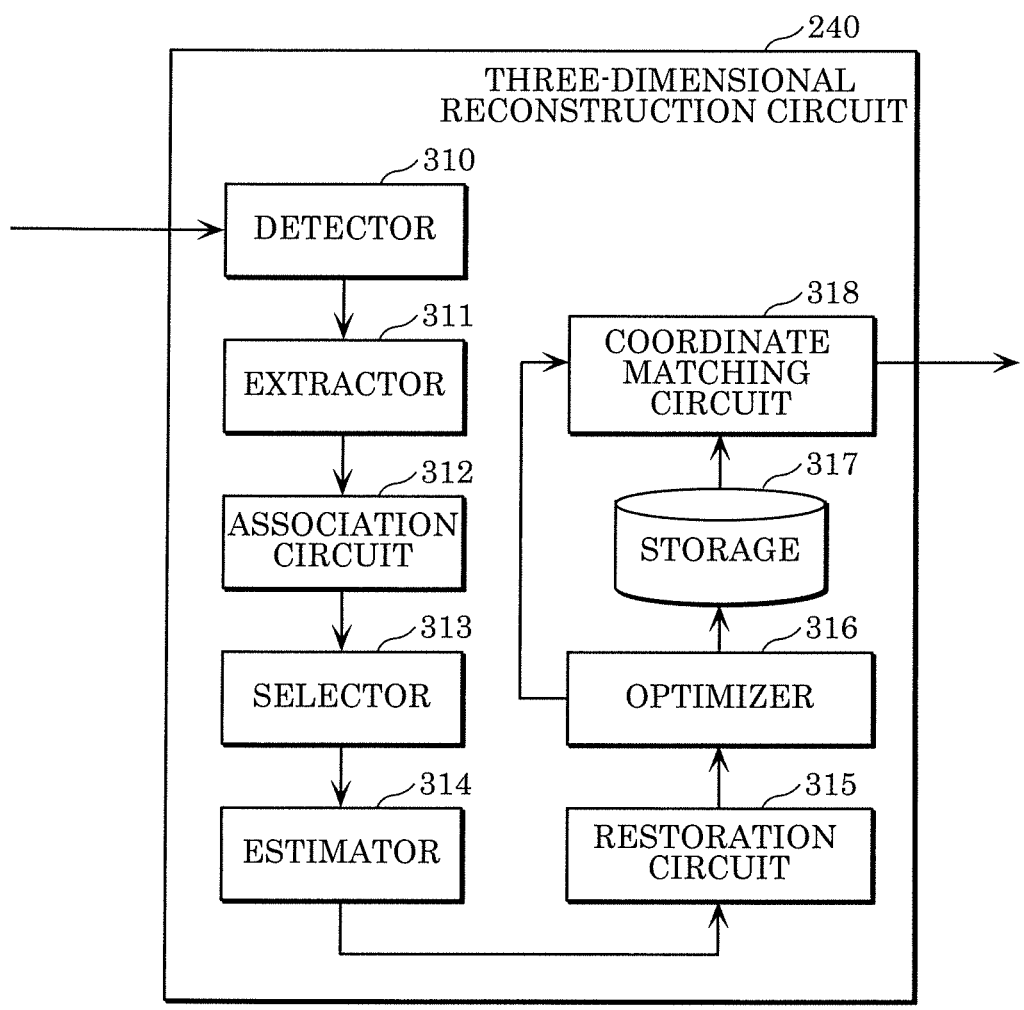
FIG. 8 is a block diagram of a three-dimensional reconstruction circuit according to an embodiment.

Next, three-dimensional reconstruction circuit 240 will be described in detail. FIG. 8 is a block diagram to show a structure of three-dimensional reconstruction circuit 240. As shown in FIG. 8, three-dimensional reconstruction circuit 240 includes detector 310, extractor 311, association circuit 312, selector 313, estimator 314, restoration circuit 315, optimizer 316, storage 317, and coordinate matching circuit 318.

Figure 9:
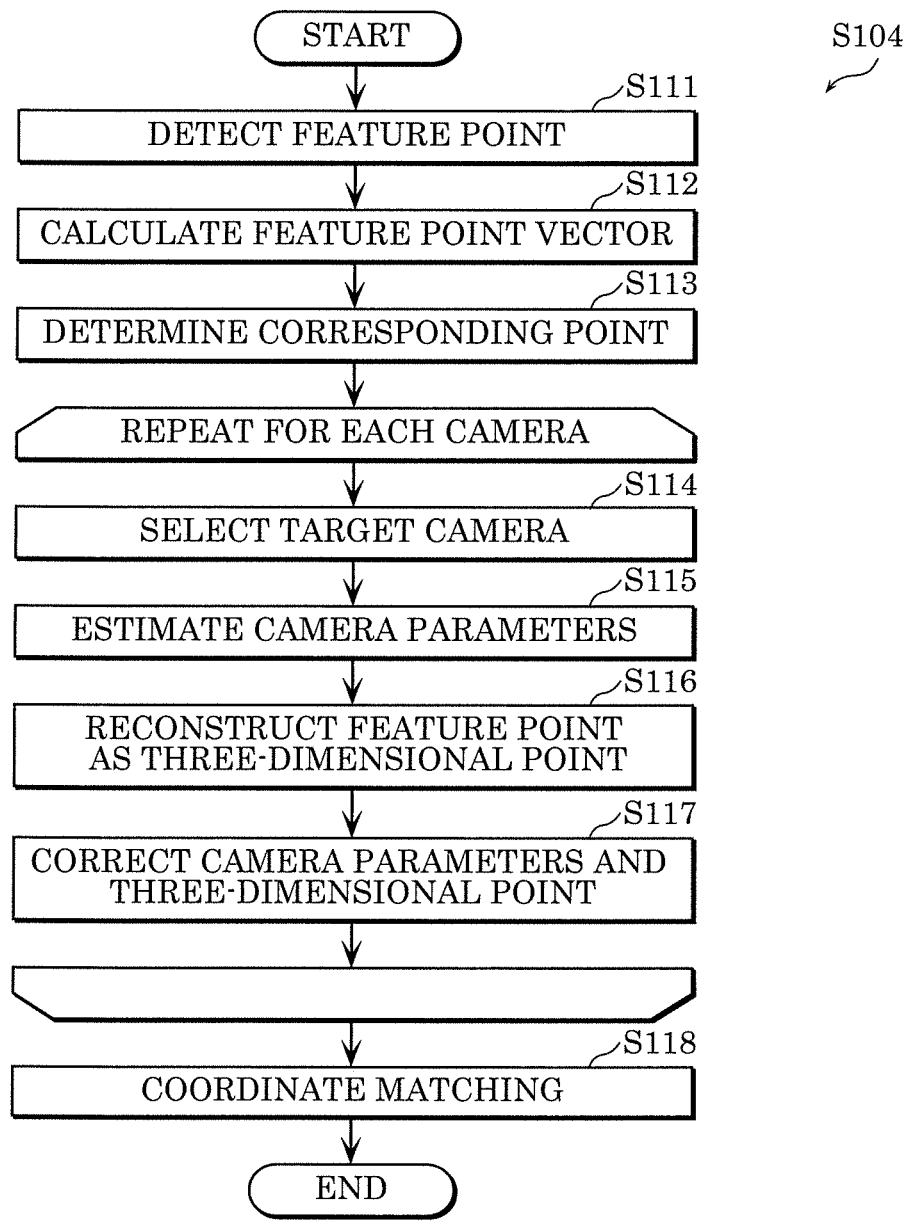
FIG. 9 is a flowchart to show processing by the three-dimensional reconstruction circuit according to an embodiment.

FIG. 9 is a flowchart to illustrate the operation of three-dimensional reconstruction circuit 240. Note that the processing shown in FIG. 9 is performed, for example, for each multi-viewpoint frame set.

First, detector 310 detects feature points of all the frames included in a multi-viewpoint frame set (S111). A feature point refers to a point, an edge, or a certain region such as a contour of an object included in a frame, a corner of an object or space, or an intersecting point of objects in a frame plane, or a point, a side, or a certain region, whose luminance or coloration is significantly different from its surroundings.

Next, extractor 311 calculates a feature vector of all the feature points detected in detector 310 (S112). A feature vector is a vector representation of distribution in the gradient direction of luminance or color of pixels included in a specific region including feature points. Note that the feature point and feature vector may be another image information. For example, the feature point and feature vector may be those that are detected by using texture information or information after frequency transformation.

Next, association circuit 312 determines a corresponding point of a frame pair using the feature vector extracted by extractor 311 (S113). For example, association circuit 312 searches a feature point of another frame, which has a feature vector similar to the feature vector of a feature point included in a certain frame, and determines these two feature points as a corresponding point. That is, the corresponding point indicates two feature points indicating a same three-dimensional point included in different frames. Moreover, association circuit 312 determines a plurality of corresponding points by performing the same processing on each feature point of each frame.

Next, selector 313 selects a target camera, which is a target of three-dimensional reconstruction, from non-estimated cameras using the corresponding points determined by association circuit 312 or a three-dimensional point calculated by optimizer 316 to be described below (S114). A non-estimated camera refers to a camera among a plurality of cameras, which is not subjected to estimation processing of camera parameters to be described below. Note that the processing from step S114 to step S117 is repetitively performed for each camera, and when all the cameras have been subjected to the processing, the process proceeds to step S118.

Next, estimator 314 estimates camera parameters of the target camera by using corresponding points determined by association circuit 312 (S115).

Next, restoration circuit 315 reconstructs a feature point in a frame as a three-dimensional point by using camera parameters estimated by estimator 314 (S116). Specifically, restoration circuit 315 reconstructs a three-dimensional model of a subject by reverse-projecting each feature point in a frame, which has been shot by the target camera, on three-dimensional coordinates.

Next, optimizer 316 corrects the camera parameters estimated by estimator 314 and a plurality of three-dimensional points restored by restoration circuit 315 such that the entire three-dimensional model is optimized, and stores the corrected three-dimensional model in storage 317 (S117).

As a result of the processing of steps S114 to S117 being performed on all the cameras, a three-dimensional model based on a multi-viewpoint frame set at a certain time is generated.

Next, coordinate matching circuit 318 performs coordinate matching processing to match coordinates of the obtained three-dimensional model with the coordinates of a reconstructed three-dimensional model at another time (S118).

In this way, three-dimensional reconstruction apparatus 200 reconstructs a first three-dimensional model from a first multi-viewpoint image obtained by shooting a real space, and reconstructs a second three-dimensional model from a second multi-viewpoint image obtained by shooting the same real space at a different time. Next, three-dimensional reconstruction apparatus 200 matches the world coordinate systems of the first three-dimensional model and the second three-dimensional model. Since this allows three-dimensional reconstruction apparatus 200 to improve the accuracy of positional relationship of three-dimensional models at each time, three-dimensional reconstruction apparatus 200 can improve the accuracy of three-dimensional model.

Hereinafter, examples of an estimation method of camera parameters using a corresponding point (S115) and reconstruction method of a three-dimensional model (S116) will be described. Three-dimensional reconstruction circuit 240 calculates coordinates and orientation of camera in a world coordinate system with epipolar geometry as a constraint condition, and further calculates a three-dimensional position in a world coordinate system of a point on the image which has been shot by the camera.

Figure 10:
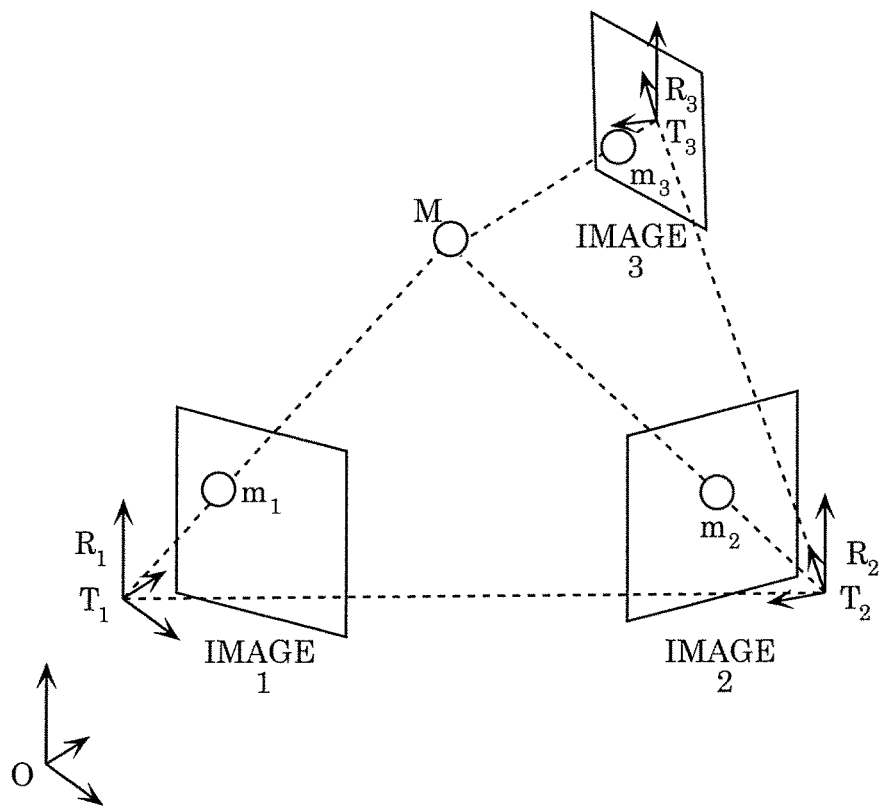
FIG. 10 is a diagram to illustrate a method for estimating camera parameters, and a method for reconstructing a three-dimensional model.

FIG. 10 is a diagram to illustrate a method for estimating camera parameters and a method for reconstructing a three-dimensional model. An example in which intrinsic parameters of camera are known, and extrinsic parameters of camera are estimated by using three frames (image 1, image 2, and image 3) to reconstruct a three-dimensional model of a subject is illustrated.

To acquire camera parameters of each camera, it is necessary to calculate rotation matrices $R_1$, $R_2$, $R_3$ and translation vectors $T_1$, $T_2$, $T_3$ of the camera in a world coordinate system with O as the origin. First, a method of calculating the rotation matrix and the translation vector of the camera that shot image 1 and image 2 will be described. When a point $m_1=(u_1, v_1, 1)$ on image 1 corresponds to a point $m_2$ on image 2, an epipolar equation which satisfies (Equation 3) holds for both.

[Math. 1]

$$m_1^T F m_2 = 0 \quad \text{(Equation 3)}$$

In Equation 3, F is called as Fundamental matrix (F matrix). Estimator 314 can acquire respective points as a point $m_1=(x_1, y_1, z_1)$ and $m_2=(x_2, y_2, z_2)$ of each camera coordinate system by a conversion equation shown in (Equation 4) using intrinsic parameters K of each camera. The epipolar equation can be rewritten as (Equation 5).

[Math. 2]

$$\tilde{m} = Km \quad \text{(Equation 4)}$$

[Math. 3]

$$\tilde{m}_1^T E \tilde{m}_2 = 0 \quad \text{(Equation 5)}$$

In Equation 5, E is called as Essential matrix (E matrix). Estimator 314 can calculate each element of E matrix by using a plurality of corresponding points. Moreover, estimator 314 may acquire E matrix by the conversion equation of (Equation 6) after calculating each element of F matrix by using a plurality of corresponding points such as points $m_1$ and $m_2$ between images.

$$E = K^1 F K \quad \text{(Equation 6)}$$

Estimator 314 can acquire a rotation matrix and a translation vector from image 1 to image 2 in the world coordinate system by decomposing this E matrix. When the position of camera 1 in the world coordinate system and the inclination of camera 1 with respect to each axis of the world coordinate system are known, estimator 314 can acquire positions and orientations of camera 1 and camera 2 in the world coordinate system by using a relative relation between camera 1 and camera 2. Estimator 314 may calculate the position and orientation of camera 1 in the world coordinate system by using camera information other than video (for example, information obtained by a sensor, such as a gyro sensor or an accelerometer, included in the camera), or may measure them in advance. Moreover, estimator 314 may calculate the position and orientation of another camera with the camera coordinate system of camera 1 as the world coordinate system.

Note that when lens distortion of camera is taken into consideration, estimator 314 corrects the position of a point on an image by using a distortion model, and acquires F matrix or E matrix by using the corrected position. Estimator 314 uses, as an example, a distortion model in the radial direction of lens as shown in (Equation 7).

$$u_{undistorted} = u(1 + k_1 r^2 + k_2 r^4 + k_3 r^6)$$

$$v_{undistorted} = v(1 + k_1 r^2 + k_2 r^4 + k_2 r^6)$$

$$r^2 = u^2 + v^2 \quad \text{(Equation 7)}$$

Moreover, restoration circuit 315 can acquire three-dimensional coordinates M of a corresponding point on the world coordinate system of the corresponding point by a triangle formed by using rotation matrices and translation vectors of image 1 and image 2.

Moreover, the above described geometrical relation can be extended to three-viewpoints. When image 3 is added to image 1 and image 2, estimator 314 calculates E matrices for image 2 and image 3, and for image 1 and image 3, respectively to acquire a relative rotation matrix and a translation vector between each camera. By integrating these, estimator 314 can calculate the rotation matrix and the translation vector in the world coordinate system of the camera of image 3.

Moreover, the rotation matrix and the translation vector of image 3 may be calculated from corresponding points in image 3 and image 1, and image 3 and image 2, respectively. Specifically, corresponding points are found between image 1 and image 2, and image 2 and image 3. When it is supposed that a point $m_3$ on image 3 corresponding to point $m_1$ on image 1 and point $m_2$ on image 2 is obtained, since the three-dimensional coordinates M of this corresponding point have been acquired, it is possible to acquire corresponding relation between a point on image 3 and coordinates in the three-dimensional space. In this situation, (Equation 8) holds.

[Math. 4]

$$\tilde{m} = Pm \quad \text{(Equation 8)}$$

Here, P is referred to as Perspective matrix (P matrix). Since the relation of (Equation 9) holds for P matrix, E matrix, and intrinsic matrix, estimator 314 can acquire E matrix of image 3, and thereby find the rotation matrix and the translation vector.

$$P = KE \quad \text{(Equation 9)}$$

Note that even when the intrinsic parameters are unknown, estimator 314 can find the intrinsic matrix and E matrix by calculating F matrix or P matrix, and thereafter dividing F matrix and P matrix under the restriction that the intrinsic matrix is an upper triangular matrix and E matrix is a positive definite symmetric matrix.

Figure 11:
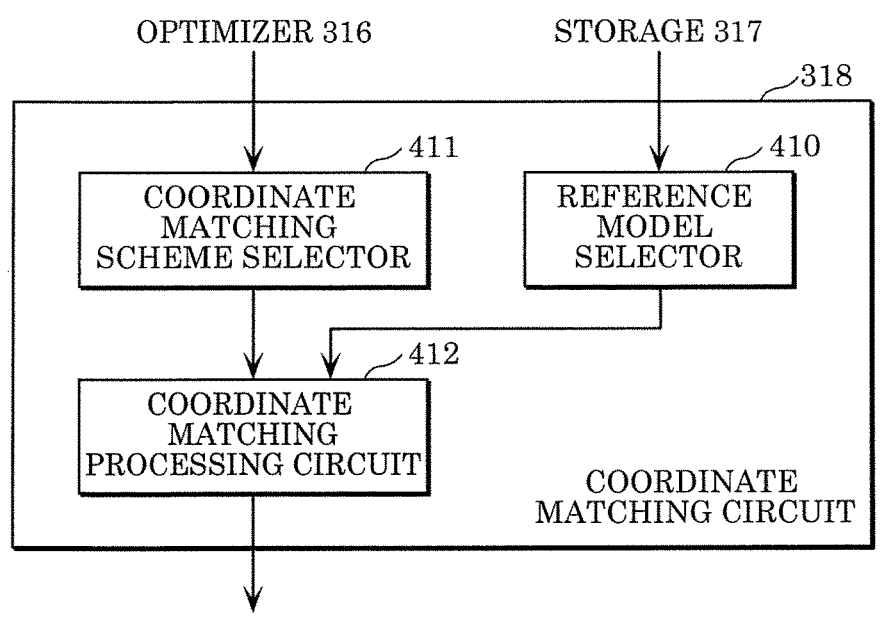
FIG. 11 is a block diagram of a coordinate matching circuit according to an embodiment.
Figure 12:
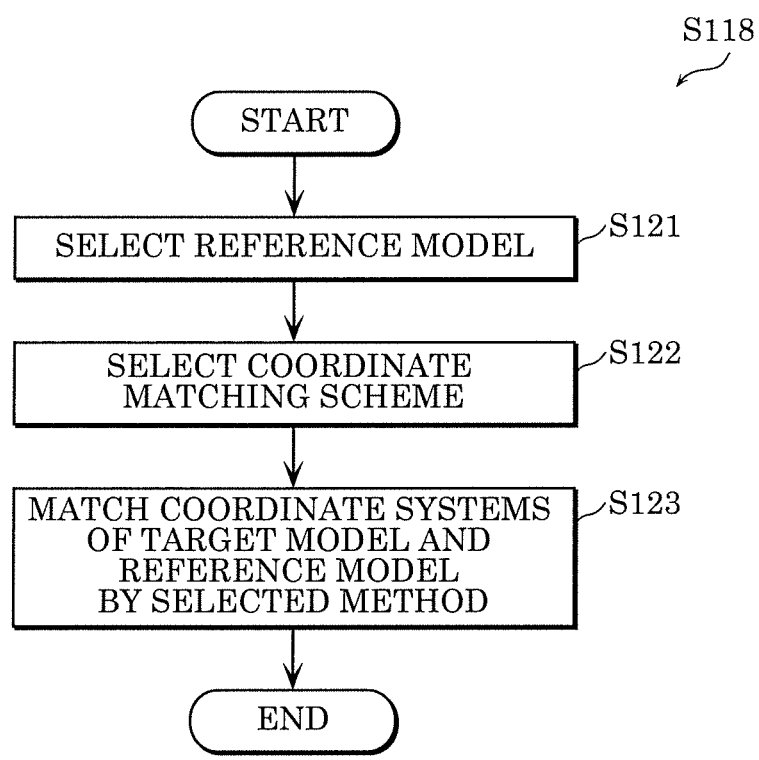
FIG. 12 is a flowchart to show the processing by the coordinate matching circuit according to an embodiment.

Hereinafter, the configuration of coordinate matching circuit 318 and details of coordinate matching processing (S118) will be described. FIG. 11 is a block diagram to illustrate the structure of coordinate matching circuit 318. FIG. 12 is a flowchart of the coordinate matching processing.

Coordinate matching circuit 318 performs coordinate matching processing to match the coordinate system of a three-dimensional model at a current time with the coordinate system of a reconstructed three-dimensional model which is stored in storage 317. The former is called as a target model, and the latter as a reference model.

Coordinate matching circuit 318 includes reference model selector 410, coordinate matching scheme selector 411, and coordinate matching processing circuit 412.

First, reference model selector 410 selects a reference model from among reconstructed three-dimensional models which are stored in storage 317 to match the coordinate system of a target model outputted by optimizer 316 with the coordinate system of the reconstructed three-dimensional model (S121). Specifically, reference model selector 410 selects a high reliability model as a reference model. For example, reference model selector 410 selects a model with a low reprojection error as the reference model. The reprojection error is an error between a point obtained by reprojecting a three-dimensional model on an image plane of each camera by using camera parameters and a feature point on an image which has served as the basis of calculating the three-dimensional model. In other words, the reprojection error is an error between a reprojected point obtained by reprojecting a three-dimensional point in a three-dimensional model on an imaging plane of multi-viewpoint image and a two-dimensional point on a multi-viewpoint image corresponding to the three-dimensional point using camera parameters of a camera which has shot the multi-viewpoint image. Note that reference model selector 410 may select a model, which is close in time to a target model, as a reference model, or may select a reference model by combining time and reliability.

Next, coordinate matching scheme selector 411 selects a method for matching coordinate systems between a target model and a reference model (S122). Specifically, coordinate matching scheme selector 411 selects either one of method 1 of minimizing error in positional parameters of part of cameras and three-dimensional models, and method 2 of minimizing error in positional parameters of all cameras and three-dimensional points. For example, coordinate matching scheme selector 411 selects method 1 when the reliability of relative relation between camera and three-dimensional model is high, and selects method 2 when the reliability is low.

Next, coordinate matching processing circuit 412 matches the coordinate systems of a target model and a reference model by using the method selected by coordinate matching scheme selector 411 (S123). Coordinate matching processing circuit 412 minimizes the error between the target model and the reference model by rotating, moving, and scaling the world coordinates of the target model while maintaining the relative relation between the camera and the three-dimensional model.

In this way, three-dimensional reconstruction apparatus 200 reconstructs a plurality of three-dimensional models including a second three-dimensional model, from each of a plurality of multi-viewpoint images obtained by shooting the same real space at different times. Three-dimensional reconstruction apparatus 200 selects a second three-dimensional model as the reference model for the first three-dimensional model from a plurality of three-dimensional models based on the reliability of a plurality of three-dimensional models. For example, three-dimensional reconstruction apparatus 200 selects a three-dimensional model having a highest reliability, or a reliability higher than a reference value. Alternatively, three-dimensional reconstruction apparatus 200 selects a second three-dimensional model as the reference model for the first three-dimensional model from a plurality of three-dimensional models based on the difference between the time of the first three-dimensional model and the time of each of the plurality of three-dimensional models. For example, three-dimensional reconstruction apparatus 200 selects a three-dimensional model in which the difference in time is smallest, or the difference in time is smaller than a reference value. Then, three-dimensional reconstruction apparatus 200 matches the world coordinates of the first three-dimensional model with the world coordinates of the second three-dimensional model.

Since this allows three-dimensional reconstruction apparatus 200 to match the world coordinates of the first three-dimensional model with the second three-dimensional model which has a high reliability or which is closer in time to the first three-dimensional model, three-dimensional reconstruction apparatus 200 can improve the accuracy of coordinate matching.

Moreover, three-dimensional reconstruction apparatus 200 selects a coordinate matching scheme based on at least one of the reliability of the first three-dimensional model or the reliability of the second three-dimensional model, and matches the world coordinate systems of the first three-dimensional model and the second three-dimensional model by using the selected coordinate matching scheme. For example, the reliability indexes a reprojection error. For example, when the reliability is higher than the reference value, three-dimensional reconstruction apparatus 200 selects the first coordinate matching scheme (coordinate matching scheme 1) which matches the world coordinate systems of the first three-dimensional model and the second three-dimensional model based on an error between a part of the first three-dimensional model and a part of the second three-dimensional model. Further, when the reliability is lower than the reference value, three-dimensional reconstruction apparatus 200 selects a second coordinate matching scheme (coordinate matching scheme 2) which matches the world coordinate systems of the first three-dimensional model and the second three-dimensional model based on an error between the whole of the first three-dimensional model and the whole of the second three-dimensional model.

Since this allows three-dimensional reconstruction apparatus 200 to use an appropriate coordinate matching scheme according to reliability, three-dimensional reconstruction apparatus 200 can improve the accuracy of coordinate matching.

Figure 13:
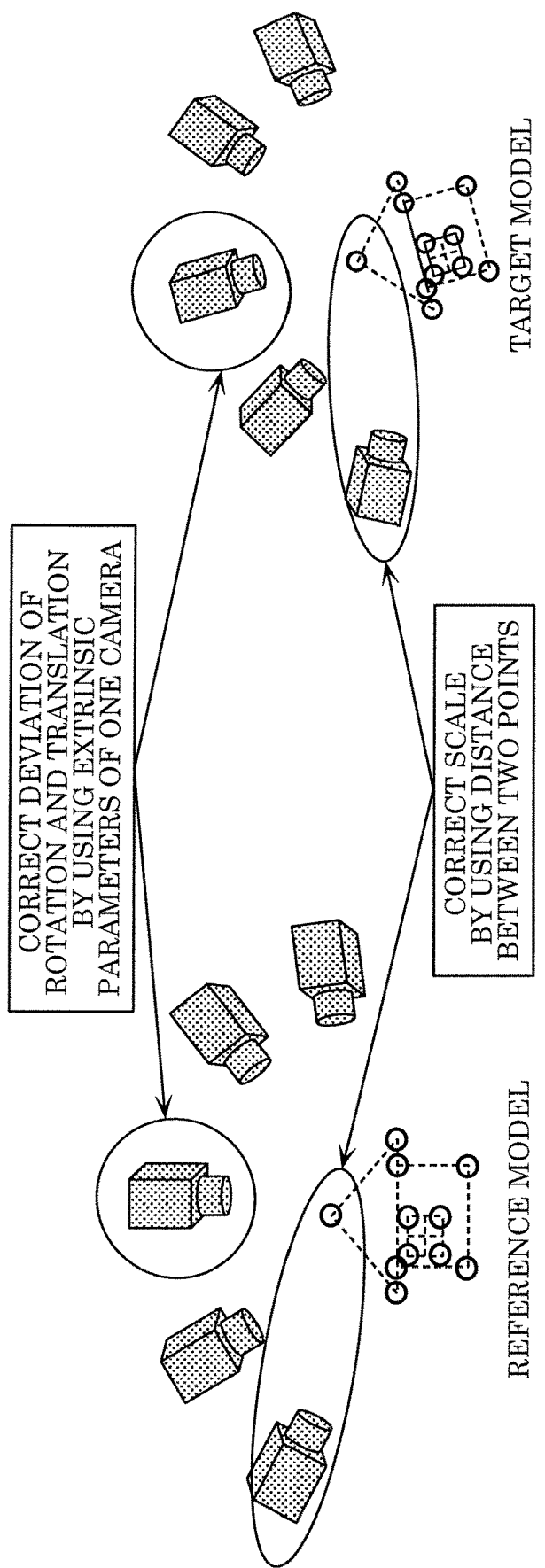
FIG. 13 is a diagram to illustrate coordinate matching scheme 1 according to an embodiment.

Hereinafter, coordinate matching scheme 1 and coordinate matching scheme 2 will be described. First, coordinate matching scheme 1 will be described. FIG. 13 is a diagram to illustrate coordinate matching scheme 1.

Coordinate matching processing circuit 412 selects a camera and two points of three-dimensional points, and calculates a ratio of scale between the world coordinate systems of the target model and the reference model by using the distance between the two points, thereby correcting the target model such that the scale of the target model comes closer to the scale of the reference model. Moreover, coordinate matching processing circuit 412 selects one camera, and calculates deviations of rotation and translation between the world coordinate systems of the target model and the reference model by using extrinsic parameters of the selected camera, thereby correcting the target model such that calculated deviations are minimized.

Specifically, coordinate matching processing circuit 412 selects two points from a plurality of cameras and a plurality of three-dimensional points included in the target model and the reference model. For example, coordinate matching processing circuit 412 selects points which have high reliability (for example, small reprojection error). Let position information of the selected two points be $P_{T1}=(x_{T1}, y_{T1}, z_{T1})$, $P_{T2}=(x_{T2}, y_{T2}, z_{T2})$ for the target model, and $P_{R1}=(x_{R1}, y_{R1}, z_{R1})$, $P_{R2}=(x_{R2}, y_{R2}, z_{R2})$ for the reference model. The distance between point $P_{T1}$ and point $P_{T2}$ is represented by (Equation 10), and the distance between point $P_{R1}$ and point $P_{R2}$ is represented by (Equation 11).

[Math. 5]

$$D_T=\sqrt{(x_{T1}-x_{T2})^2+(y_{T1}-y_{T2})^2+(z_{T1}-z_{T2})^2} \quad \text{(Equation 10)}$$

$$D_R=\sqrt{(x_{R1}-x_{R2})^2+(y_{R1}-y_{R2})^2+(z_{R1}-z_{R2})^2} \quad \text{(Equation 11)}$$

In this situation, the ratio of scale between the two models is represented by (Equation 12).

$$S=D_R/D_T \quad \text{(Equation 12)}$$

Coordinate matching processing circuit 412 corrects the scale by multiplying position information $P_{TK}$ of all the cameras and three-dimensional points of the target model by this ratio S as shown in (Equation 13).

$$P'_{TK}=SP_{TK} \quad \text{(Equation 13)}$$

Moreover, coordinate matching processing circuit 412 also corrects scale of translation vector $T_{TCn}$ of each camera of the target model as sown in (Equation 14) through a relation T=−RP among rotation matrix, translation vector, and three-dimensional position.

$$T'_{TCn}=ST_{TCn} \quad \text{(Equation 14)}$$

Next, coordinate matching processing circuit 412 selects one corresponding camera in each of the target model and the reference model. Let the camera selected in the target model be target camera TC1, and the camera selected in the reference model be reference camera RC1. Further, let the rotation matrix of the target camera be $R_{TC1}$, the translation vector be $T_{TC1}$, and three-dimensional position be $P'_{TC1}$. Also let the rotation matrix of the reference camera be $R_{RC1}$, the translation vector be $T_{RC1}$, and three-dimensional position be $P_{RC1}$. Coordinate matching processing circuit 412 calculates relative rotation matrix $R_{dif}$ between rotation matrix $R_{TC}$ of the target camera and the rotation matrix $R_{RC}$ of the reference camera by using (Equation 15).

[Math. 6]

$$R_{dif} = R_{RC1}{}^T R_{TC1} \; (R_{RC1}{}^T \text{ represents a transposed matrix of } R_{RC1}) \quad \text{(Equation 15)}$$

Coordinate matching processing circuit 412 corrects the inclination of the coordinate system by multiplying the rotation matrix $R_{Tn}$ of all the camera of the target model by the calculated relative rotation matrix $R_{dif}$ as shown in (Equation 16).

[Math. 7]

$$R'_{dif} = R_{dif} R_{TCn}{}^T \quad \text{(Equation 16)}$$

Next, coordinate matching processing circuit 412 calculates the relative three-dimensional position $P_{dif}$ between the three-dimensional position $P_{TC1}$ of the target camera and the three-dimensional position $P_{RC1}$ of the reference camera by using (Equation 17).

$$P_{dif} = P_{RC1} - P'_{TC1} \quad \text{(Equation 17)}$$

Coordinate matching processing circuit 412 corrects positions by adding calculated relative three-dimensional position $P_{dif}$ to position information $P'_{TK}$ of all the cameras and three-dimensional points of the target model as shown in (Equation 18). Moreover, coordinate matching processing circuit 412 also corrects translation vector $T'_{TCn}$ for cameras as shown in (FIG. 19).

$$P''_{TK} = P'_{TK} + P_{dif} \quad \text{(Equation 18)}$$

$$T''_{TCn} = -R'_{TCn} + P''_{TCn} \quad \text{(Equation 19)}$$

Note that coordinate matching processing circuit 412 does not necessarily need to perform all the coordinate matching of rotation matrix, translation vector, and scale, and may perform any one of them.

In this way, the first three-dimensional model (target model) includes a plurality of three-dimensional points indicating a subject of the first multi-viewpoint image, and positions and orientations of a plurality of cameras that have shot the first multi-viewpoint image. Similarly, the second three-dimensional model (reference model) includes a plurality of three-dimensional points indicating a subject of the second multi-viewpoint image, and three-dimensional positions and orientations of a plurality of cameras which have shot the second multi-viewpoint image. Three-dimensional reconstruction apparatus 200 matches the world coordinates of three-dimensional points of a plurality of subjects and three-dimensional positions and orientations of a plurality of cameras between the first three-dimensional model and the second three-dimensional model. Note that the three-dimensional position and orientation of camera may be included in a three-dimensional model, or may be outputted as camera parameters or in another form.

Further, when the first coordinate matching scheme is selected, three-dimensional reconstruction apparatus 200 selects two points of the plurality of three-dimensional points and three-dimensional positions of the plurality of cameras, and corrects deviation of scale between the first three-dimensional model and the second three-dimensional model based on the distance between the selected two points in each of the first three-dimensional model and the second three-dimensional model. Moreover, three-dimensional reconstruction apparatus 200 selects one of the plurality of cameras and corrects deviation in rotation or translation between the first three-dimensional model and the second three-dimensional model based on the three-dimensional position and orientation of the selected camera in each of the first three-dimensional model and the second three-dimensional model.

Next, coordinate matching scheme 2 will be described. FIG. 14 is a diagram to illustrate coordinate matching scheme 2.

In coordinate matching scheme 2, coordinate matching processing circuit 412 adjusts rotation matrix R, translation vector T, and scale s of the world coordinate system of the target model such that the error on position information of all the cameras and three-dimensional points is minimized, while maintaining relative relation within the target model and the reference model.

Specifically, coordinate matching processing circuit 412 performs minimization of the error through Iterative Closest Point by using (Equation 20). Let position information of a camera and three-dimensional point of the target model be $P_{TK}$, and position information of a camera and three-dimen-sional point of the reference model be $P_{RK}$.

[Math. 8]

$$err = \sum_{K=n}^{N} \|P_{Rn} - sRP_{Tn} - T\|^2 \quad \text{(Equation 20)}$$

Note that coordinate matching processing circuit 412 may use a part of cameras and three-dimensional points instead of using all of the cameras and three-dimensional points. In this situation, coordinate matching processing circuit 412 may calculate reliability of each three-dimensional point based on a reprojection error of each three-dimensional point, and use only points having high reliability.

Note that coordinate matching processing circuit 412 does not need to perform all of the coordinate matching of rotation matrix, translation vector, and scale, and may perform any one of them.

In this way, when the second coordinate matching scheme is selected, three-dimensional reconstruction apparatus 200 corrects at least one of rotation, translation, or scale of one of the first three-dimensional model or the second three-dimensional model such that the error on positions of a plurality of three-dimensional points and three-dimensional positions of a plurality of cameras in the first three-dimensional model and the second three-dimensional model is reduced while maintaining relative relation between a plurality of three-dimensional points and three-dimensional positions of a plurality of cameras in the first three-dimensional model, and relative relation between a plurality of three-dimensional points and three-dimensional positions of a plurality of cameras in the second three-dimensional model.

Hereinafter, variations of the embodiment of the present disclosure will be described.

For example, although an example in which one reference model is used has been described in the above description, a plurality of reference models may be used. For example, supposing the time of a target model being t, reference model selector 410 may select two three-dimensional models: that three-dimensional models of time t−1 and time t−2, as the reference model. That is, reference model selector 410 may select two three-dimensional models which are prior in time and closest in time to the target model. Alternatively, reference model selector 410 may select two three-dimensional models of time 0 and time t−1 as the reference model. That is, reference model selector 410 may select a three-dimensional model which is first in time, and one three-dimensional model which is prior in time and closest in time to the target model. Alternatively, reference model selector 410 may select two three-dimensional models of time t−1 and time t+1 as the reference model. That is, reference model selector 410 may select one three-dimensional model which is prior in time and closest in time to the target model, and one three-dimensional model which is posterior in time and closest in time to the target model.

Further, reference model selector 410 may select three or more three-dimensional models from three-dimensional models which are prior or posterior in time to the target model, as the reference model.

Further, a target model after coordinate matching may be stored in storage 317, and the target model after coordinate matching may be used as the reference model for coordinate matching thereafter.

Further, coordinate matching circuit 318 does not need to perform coordinate matching when a multi-viewpoint image used in the reconstruction of the target model includes a scene different from that of a multi-viewpoint image at a prior time due to movement of the camera, such as panning and tilting. That is, coordinate matching circuit 318 does not need to perform coordinate matching when it discriminates switching of scene, and the scene has been switched.

Although a three-dimensional reconstruction system according to the embodiments of the present disclosure have been described above, the present disclosure is not limited to such embodiments.

Note that each of the processing circuits included in the three-dimensional reconstruction system according to the embodiments is implemented typically as a large-scale integration (LSI), which is an integrated circuit (IC). They may take the form of individual chips, or one or more or all of them may be encapsulated into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

Also, the present disclosure may be embodied as various methods performed by the three-dimensional reconstruction system.

Also, the divisions of the blocks shown in the block diagrams are mere examples, and thus a plurality of blocks may be implemented as a single block, or a single block may be divided into a plurality of blocks, or one or more operations may be performed in another block. Also, the operations of a plurality of blocks performing similar operations may be performed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

Although the three-dimensional reconstruction system according to one or more aspects has been described on the basis of the embodiments, the present disclosure is not limited to such embodiments. The one or more aspects may thus include forms obtained by making various modifications to the above embodiments that can be conceived by those skilled in the art, as well as forms obtained by combining structural components in different embodiments, without materially departing from the spirit of the present disclosure.

What is claimed is:

1. A three-dimensional reconstruction method comprising:
reconstructing a first three-dimensional model from a first multi-viewpoint image obtained by shooting a real space, and reconstructing a second three-dimensional model from a second multi-viewpoint image obtained by shooting the real space at a different time; and
matching world coordinate systems of the first three-dimensional model and the second three-dimensional model, wherein
in the matching,
a coordinate matching scheme is selected based on at least one of reliability of the first three-dimensional model or reliability of the second three-dimensional model, and the world coordinate systems of the first three-dimensional model and the second three-dimensional model are matched by using the coordinate matching scheme selected,
a first coordinate matching scheme is selected when the reliability is higher than a reference value, the first coordinate matching scheme being a method in which world coordinate systems of the first three-dimensional model and the second three-dimensional model are matched based on an error between a part of the first three-dimensional model and a part of the second three-dimensional model, and
a second coordinate matching scheme is selected when the reliability is lower than the reference value, the second coordinate matching scheme being a method in which world coordinate systems of the first three-dimensional model and the second three-dimensional model are matched based on an error between a whole of the first three-dimensional model and a whole of the second three-dimensional model.

2. The three-dimensional reconstruction method according to claim 1, wherein
the reliability of the three-dimensional model utilizes, as an index, an error between a reprojection point which is obtained by reprojecting a three-dimensional point in the three-dimensional model onto an imaging plane of the multi-viewpoint image using camera parameters of a camera which is used for shooting the multi-viewpoint image, and a two-dimensional point on the multi-viewpoint image, the two-dimensional point corresponding to the three-dimensional point.

3. The three-dimensional reconstruction method according to claim 1, wherein
the first three-dimensional model includes a plurality of three-dimensional points indicating a subject of the first multi-viewpoint image, and positions and orientations of a plurality of cameras that shot the first multi-viewpoint image, the second three-dimensional model includes a plurality of three-dimensional points indicating a subject of the second multi-viewpoint image, and three-dimensional positions and orientations of a plurality of cameras that shot the second multi-viewpoint image, and in the matching, world coordinates of three-dimensional points of a plurality of subjects and three-dimensional positions and orientations of a plurality of cameras are matched.

4. The three-dimensional reconstruction method according to claim 3, wherein in the matching, when the first coordinate matching scheme is selected:

two points are selected out of the plurality of three-dimensional points and the three-dimensional positions of the plurality of cameras; and deviation of scale between the first three-dimensional model and the second three-dimensional model is corrected based on a distance between the two points selected in each of the first three-dimensional model and the second three-dimensional model.

5. The three-dimensional reconstruction method according to claim 3, wherein in the matching, when the first coordinate matching scheme is selected:

one camera is selected out of the plurality of cameras; and deviation in rotation or translation between the first three-dimensional model and the second three-dimensional model is corrected based on the three-dimensional position and the orientation of the one camera selected in each of the first three-dimensional model and the second three-dimensional model.

6. The three-dimensional reconstruction method according to claim 3, wherein in the matching, when the second coordinate matching scheme is selected, at least one of rotation, translation, or scale of one of the first three-dimensional model and the second three-dimensional model is corrected such that an error on positions of the plurality of three-dimensional points and three-dimensional positions of the plurality of cameras in the first three-dimensional model and the second three-dimensional model is reduced while maintaining relative relation between the plurality of three-dimensional points and the three-dimensional positions of the plurality of cameras in the first three-dimensional model, and relative relation between the plurality of three-dimensional points and the three-dimensional positions of the plurality of cameras in the second three-dimensional model.

7. The three-dimensional reconstruction method according to claim 1, wherein in the reconstructing, a plurality of three-dimensional models including the second three-dimensional model are reconstructed from each of a plurality of multi-viewpoint images obtained by shooting the real space at different times, and in the matching:

the second three-dimensional model is selected as the reference model for the first three-dimensional model from the plurality of three-dimensional models based on reliability of the plurality of three-dimensional models, and world coordinates of the first three-dimensional model are matched with world coordinates of the second three-dimensional model.

8. A three-dimensional reconstruction method comprising:

reconstructing a first three-dimensional model from a first multi-viewpoint image obtained by shooting a real space, and reconstructing a second three-dimensional model from a second multi-viewpoint image obtained by shooting the real space at a different time; and matching world coordinate systems of the first three-dimensional model and the second three-dimensional model, wherein in the reconstructing, a plurality of three-dimensional models including the second three-dimensional model are reconstructed from each of a plurality of multi-viewpoint images obtained by shooting the real space at different times, and in the matching, the second three-dimensional model is selected as the reference model for the first three-dimensional model from the plurality of three-dimensional models based on a difference between a time of the first three-dimensional model and a time of each of the plurality of three-dimensional models, and world coordinates of the first three-dimensional model are matched with world coordinates of the second three-dimensional model.

9. A three-dimensional reconstruction apparatus comprising:

a reconstruction circuit configured to reconstruct a first three-dimensional model from a first multi-viewpoint image obtained by shooting a real space, and reconstruct a second three-dimensional model from a second multi-viewpoint image obtained by shooting the real space at a different time; and a coordinate matching circuit configured to match world coordinate systems of the first three-dimensional model and the second three-dimensional model, wherein the reconstruction circuit is configured to reconstruct a plurality of three-dimensional models including the second three-dimensional model from each of a plurality of multi-viewpoint images obtained by shooting the real space at different times, and the coordinate matching circuit is configured to:

select the second three-dimensional model as the reference model for the first three-dimensional model from the plurality of three-dimensional models based on a difference between a time of the first three-dimensional model and a time of each of the plurality of three-dimensional models; and match world coordinates of the first three-dimensional model with world coordinates of the second three-dimensional model.

10. A generation method for generating a three-dimensional model, the generation method comprising:

generating a first three-dimensional model from first images, the first images being generated by shooting a real space from respective viewpoints at a first timing;

generating a second three-dimensional model from second images, the second images being generated by shooting the real space from respective viewpoints at a second timing different from the first timing; and matching a first world coordinate system of the first three-dimensional model and a second world coordinate system of the second three-dimensional model, wherein in the generating of the second three-dimensional model, a plurality of three-dimensional models including the second three-dimensional model are generated from each of a plurality of multi-viewpoint images obtained by shooting the real space at different times, and in the matching, the second three-dimensional model is selected as the reference model for the first three-dimensional model from the plurality of three-dimensional models based on a difference between a time of the first three-dimensional model and a time of each of the plurality of three-dimensional models, and world coordinates of the first three-dimensional model are matched with world coordinates of the second three-dimensional model.

11. The generation method according to claim 10, wherein in the matching, a coordinate matching scheme is selected based on at least one of first reliability of the first three-dimensional model or second reliability of the second three-dimensional model, and the first world coordinate system and the second world coordinate system are matched according to the coordinate matching scheme selected.

12. The generation method according to claim 11, wherein the first reliability is determined based on an error between a reprojection point and a two-dimensional point, the reprojection point being generated by reprojecting a three-dimensional point in the first three-dimensional model onto an imaging plane of the first images using camera parameters of cameras, the cameras being provided to generate the first images, the two-dimensional point being provided on the first images and corresponding to the three-dimensional point.

* * * * *